(12) United States Patent
Geetha et al.

(10) Patent No.: US 11,741,028 B1
(45) Date of Patent: Aug. 29, 2023

(54) EFFICIENTLY STRIPING ORDERED PCIE WRITES ACROSS MULTIPLE SOCKET-TO-SOCKET LINKS

(71) Applicant: QUALCOMM Incorporated, San Diego, CA (US)

(72) Inventors: Vedaraman Geetha, Fremont, CA (US); Keith Robert Pflederer, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/664,317

(22) Filed: May 20, 2022

(51) Int. Cl.
*G06F 13/20* (2006.01)
*G06F 13/16* (2006.01)

(52) U.S. Cl.
CPC .......... *G06F 13/20* (2013.01); *G06F 13/1694* (2013.01); *G06F 2213/0026* (2013.01); *G06F 2213/0038* (2013.01)

(58) Field of Classification Search
CPC .. G06F 13/20; G06F 13/1694; G06F 13/4027; G06F 13/4068; G06F 13/4221; G06F 2213/0026; G06F 2213/0038
See application file for complete search history.

(56) References Cited

U.S. PATENT DOCUMENTS

| | | | |
|---|---|---|---|
| 11,074,206 B1* | 7/2021 | Jalal | G06F 13/4013 |
| 2017/0168876 A1* | 6/2017 | Tummala | G06F 9/50 |
| 2019/0342034 A1* | 11/2019 | Man | H04L 1/16 |
| 2022/0350771 A1* | 11/2022 | Ringe | G06F 13/4068 |

\* cited by examiner

*Primary Examiner* — Raymond N Phan
(74) *Attorney, Agent, or Firm* — Muncy, Geissler, Olds & Lowe, P.C./QUALCOMM

(57) ABSTRACT

Innovative techniques to efficient stripe ordered writes across multiple socket-to-socket links. The ordered writes may be PCIe ordered writes. Each socket-to-socket write (or remote write) for an address may be converted into two transactions. The first transaction may ensure that coherency for the address is ensured. The second transaction may be the actual request transaction to write the data of the address. In so doing, when multiple remote writes are involved, the remote writes may be distributed over multiple socket-to-socket links to maximize bandwidth.

24 Claims, 12 Drawing Sheets

US 11,741,028 B1

EFFICIENTLY STRIPING ORDERED PCIE WRITES ACROSS MULTIPLE SOCKET-TO-SOCKET LINKS

FIELD OF DISCLOSURE

This disclosure relates generally to efficiently striping writes across socket-to-socket (S2S) links. The writes may be peripheral component interconnect (PCI) enhanced (PCIe) ordered writes.

BACKGROUND

Peripheral component interconnect (PCI) enhanced (PCIe) writes from a same source often must be completed in order. This implies that any agents in a system should not be able to see stale value of address A while it is able to see an updated value of address B, where address B is younger than address A as issued by the PCIe agent. This is referred to as ordered write observation (OWO).

Maintaining OWO within a single chip or socket is not much of a concern since in-socket latency is typically very short. However, when exchanging data among separate sockets, maintaining OWO can be problematic in that inter-socket latencies can be relatively long. Thus, when data is exchanged among different chips or sockets, performance can degrade due to the long latencies.

Accordingly, there is a need for systems, apparatus, and methods that overcome the deficiencies of conventional data exchange among separate sockets.

SUMMARY

The following presents a simplified summary relating to one or more aspects and/or examples associated with the apparatus and methods disclosed herein. As such, the following summary should not be considered an extensive overview relating to all contemplated aspects and/or examples, nor should the following summary be regarded to identify key or critical elements relating to all contemplated aspects and/or examples or to delineate the scope associated with any particular aspect and/or example. Accordingly, the following summary has the sole purpose to present certain concepts relating to one or more aspects and/or examples relating to the apparatus and methods disclosed herein in a simplified form to precede the detailed description presented below.

An exemplary local socket is disclosed. The local socket may comprise one or more local input-output (IO) coherence request nodes (RNI) configured to communicate with corresponding one or more IO agents. The one or more local RNIs may comprise a local RNI configured to communicate with an IO agent. The local socket may also comprise a plurality of local socket-to-socket (S2S) bridges configured to communicate with corresponding remote S2S bridges of a remote socket. The plurality of local S2S bridges may comprise a first local S2S bridge configured to communicate with a first remote S2S bridge. The local RNI may be configured to send, on behalf of the IO agent, a first remote write transaction for a first address in an intra-socket protocol to the first local S2S bridge. The first local S2S bridge may be configured to send a first address coherency request in an inter-socket protocol to a first remote S2S bridge of the remote socket upon receiving the first remote write transaction. The first address coherency request may be a request to clean all coherent copies of the first address out of one or more caches and written to memory. The first local S2S bridge may also be configured to receive a first completion response in the inter-socket protocol from the first remote S2S bridge subsequent to sending the first address coherency request. The first completion response may be a response indicating that a coherency for the first address is completed. The first local S2S bridge may further be configured to send a first combination response in the intra-socket protocol to the local RNI upon receiving the first completion response. The first combination response may indicate that the coherency for the first address is completed and a buffer is ready to receive a first data for the first address. The local RNI may also be configured to send the first data for the first address in the intra-socket protocol to the first local S2S bridge upon receiving the first combination response. The first local S2S bridge may yet further be configured to forward the first data as a write transaction in the inter-socket protocol to the first remote S2S bridge upon receiving the first data.

An exemplary method of a local socket is disclosed. The method may comprise sending, by a local input-output (IO) coherence request node (RNI) on behalf of an IO agent, a first remote write transaction for a first address in an intra-socket protocol to a first local S2S bridge. The local RNI may be one of one or more local RNIs of the local socket configured to communicate with corresponding one or more IO agents. The first local S2S bridge may be one of a plurality of local S2S bridges of the local socket configured to communicate with corresponding remote S2S bridges of a remote socket. The method may also comprise sending, by the first local S2S bridge, a first address coherency request in an inter-socket protocol to a first remote S2S bridge upon receiving the first remote write transaction. The first address coherency request may be a request to clean all coherent copies of the first address out of one or more caches and written to memory. The method may further comprise receiving, by the first local S2S bridge, a first completion response in the inter-socket protocol from the first remote S2S bridge subsequent to sending the first address coherency request. The first completion response may be a response indicating that a coherency for the first address is completed. The method may yet comprise sending, by the first local S2S bridge, a first combination response in the intra-socket protocol to the local RNI upon receiving the first completion response. The first combination response may indicate that the coherency for the first address is completed, and a buffer is ready to receive a first data for the first address. The method may yet further comprise sending, by the local RNI, the first data for the first address in the intra-socket protocol to the first local S2S bridge upon receiving the first combination response. The method may additionally comprise forwarding, by the first local S2S bridge, the first data as a write transaction in the inter-socket protocol to the first remote S2S bridge upon receiving the first data.

An exemplary local socket is disclosed. The local socket may comprise one or more local input-output (IO) coherence request nodes (RNI) configured to communicate with corresponding one or more IO agents. The one or more local RNIs may comprise a local RNI configured to communicate with an IO agent. The local socket may also comprise a plurality of local socket-to-socket (S2S) bridges configured to communicate with corresponding remote S2S bridges of a remote socket. The plurality of local S2S bridges may comprise a first local S2S bridge configured to communicate with a first remote S2S bridge. The local RNI may comprise means for sending, on behalf of the IO agent, a first remote write transaction for a first address in an intra-socket protocol to the first local S2S bridge. The first local S2S bridge may comprise means for sending a first address coherency request in an inter-socket protocol to a first remote S2S bridge of the remote socket upon receiving the first remote write transaction. The first address coherency request may be a request to clean all coherent copies of the first address out of one or more caches and written to memory. The first local S2S bridge may also comprise means for receiving a first completion response in the inter-socket protocol from the first remote S2S bridge subsequent to sending the first address coherency request. The first completion response may be a response indicating that a coherency for the first address is completed. The first local S2S bridge may further comprise means for sending a first combination response in the intra-socket protocol to the local RNI upon receiving the first completion response. The first combination response may indicate that the coherency for the first address is completed, and a buffer is ready to receive a first data for the first address. The local RNI may also comprise means for sending the first data for the first address in the intra-socket protocol to the first local S2S bridge upon receiving the first combination response. The first local S2S bridge may yet further comprise means for forwarding the first data as a write transaction in the inter-socket protocol to the first remote S2S bridge upon receiving the first data.

Other features and advantages associated with the apparatus and methods disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure.

Figure 1:
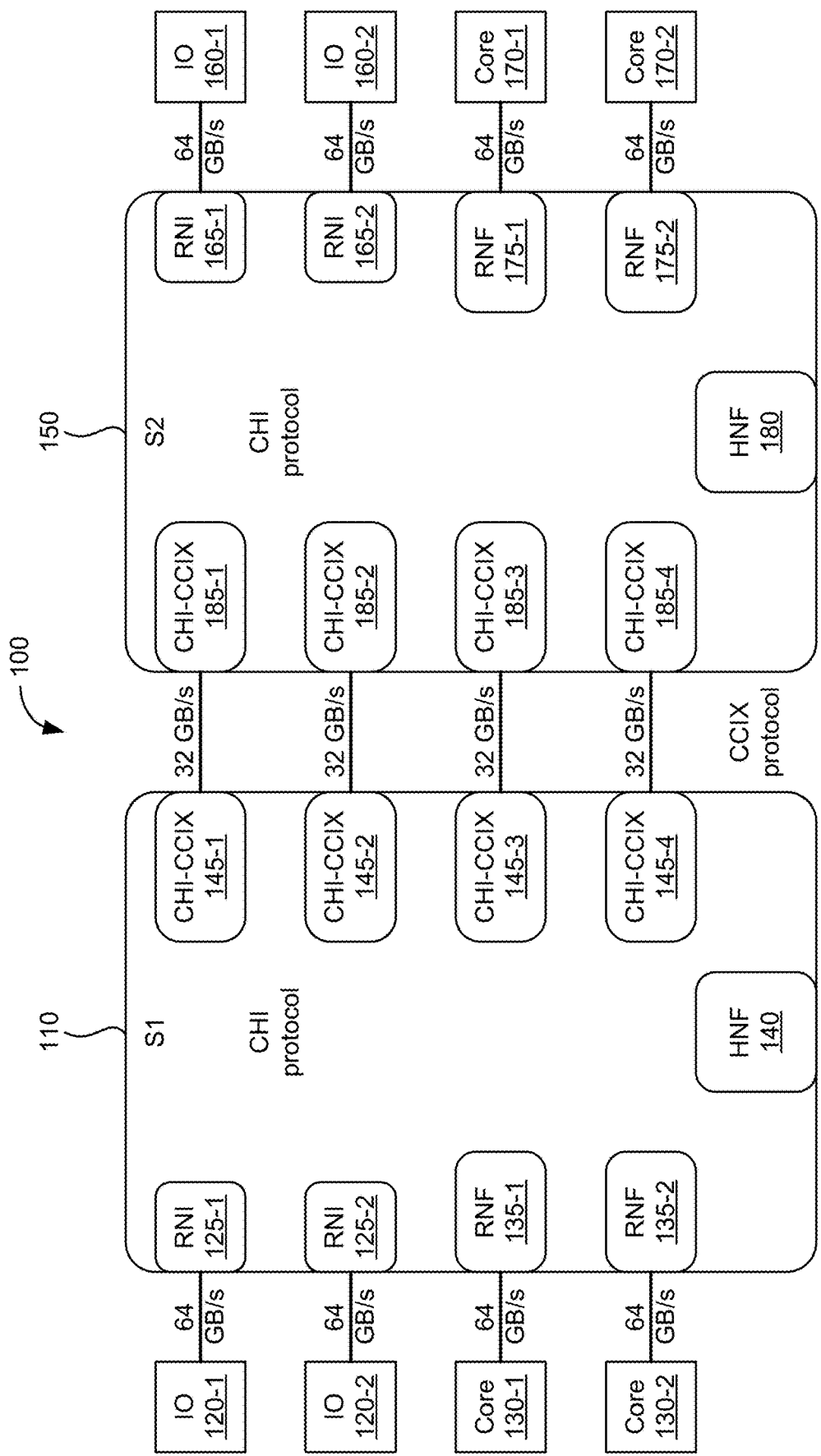
FIG. 1 illustrates a system with local and remote sockets, in accordance with at one or more aspects of the disclosure.

Other objects and advantages associated with the aspects disclosed herein will be apparent to those skilled in the art based on the accompanying drawings and detailed description. In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Aspects of the present disclosure are illustrated in the following description and related drawings directed to specific embodiments. Alternate aspects or embodiments may be devised without departing from the scope of the teachings herein. Additionally, well-known elements of the illustrative embodiments herein may not be described in detail or may be omitted so as not to obscure the relevant details of the teachings in the present disclosure.

In certain described example implementations, instances are identified where various component structures and portions of operations can be taken from known, conventional techniques, and then arranged in accordance with one or more exemplary embodiments. In such instances, internal details of the known, conventional component structures and/or portions of operations may be omitted to help avoid potential obfuscation of the concepts illustrated in the illustrative embodiments disclosed herein.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

FIG. 1 illustrates a system 100 with first and second sockets 110, 150. For ease of explanation, the first and second sockets 110, 150 are assumed to operate in the PCIe domain using the Advanced RISC Machines (ARM) coherence protocol, which includes an on-chip coherence protocol and a socket-to-socket (S2S) coherence protocol. The on-chip (may also be referred to as an on-socket) coherence protocol may be the ARM Microcontroller Bus Architecture (AMBA) Coherent Hub Interconnect (CHI). Thus, within each socket 110, 150, the CHI protocol may be used. Across sockets 110, 150, Cache Coherent Interconnect for Accelerators (CCIX) protocol may be used.

The first socket 110 may include first and second input-output (IO) coherence request nodes (RNI) 125-1, 125-2 (collectively or singularly RNI 125) configured to communicate with corresponding first and second IO agents 120-1, 120-2 (collectively or singularly IO agent 120). The RNIs 125 do not include hardware-coherent caches. The RNIs 125 may serve as bridges to enable the corresponding IO agents 120 to enter into the CHI communication domain. While two RNIs 125 are shown, there can be any number of RNIs 125 (i.e., one or more) connected to corresponding any number of IO agents.

The first socket 110 may also include first and second fully coherent request nodes (RNF) 135-1, 135-2 (collectively or singularly RNF 135) configured to communicate with corresponding first and second core agents 130-1, 130-2 (collectively or singularly core agent 130). In an aspect, these may be cores of CPUs. The RNFs 135 do include hardware-coherent caches. The RNFs 135 may serve as bridges to enable the corresponding core agents 130 to enter into the CHI communication domain. While two RNFs 135 are shown, there can be any number of RNFs 135 (i.e., one or more) connected to corresponding any number of core agents.

The first socket 110 may further include a fully coherent home node (HNF) 140. The HNF 140 may be a bridge to memory (e.g., double data rate (DDR) memory, non-volatile memory (NV-MEM), etc.). That is, the HNF 140 may control access to memory (not shown) to ensure that the coherency of the memory is maintained.

The first socket 110 may yet further include first, second, third and fourth inter-socket bridges 145-1, 145-2, 145-3, 145-4 (collectively or singularly inter-socket bridge 145). In an aspect, these inter-socket bridges may convert between CHI and CCIX protocols. Thus, they may also be referred to as CHI-CCIX bridges (CCB) 145-1, 145-2, 145-3, 145-4 (collectively or singularly CHI-CCIX bridge or CCB 145). These bridges may be configured to communicate with counterpart CHI-CCIX (or inter-socket) bridges of another socket (e.g., of the second socket 150).

The second socket 150 may include similar components. The second socket 150 may include one or more RNIs 165 configured to communicate with corresponding one or more IO agents (FIG. 1 illustrates first and second RNIs 165-1, 165-2 communicating with first and second IO agents 160-1, 160-2 (collectively or singularly IO agent 160). The RNIs 165 may not include hardware-coherent cache.

The second socket 150 may also include one or more RNFs 175 configured to communicate with corresponding one or more core agents (FIG. 1 illustrates first and second RNFs 175-1, 175-2 communicating with first and second core agents 170-1, 170-2 (collectively or singularly core agent 170). The RNFs 175 may include hardware-coherent cache.

The second socket 150 may further include an HNF 180. While not shown, the HNF 180 may be a bridge to memory (e.g., double data rate (DDR) memory, non-volatile memory (NV-MEM), etc.). That is, the HNF 180 may control access to memory to ensure that the coherency of the memory is maintained.

The second socket 150 may yet further include a plurality of inter-socket (e.g., CHI-CCIX) bridges 185 configured to communicate with counter-part inter-socket bridges of another socket (FIG. 1 illustrates four CCBs 145 of the first socket 110 communicating with four CCBs 185 of the second socket 150).

The bandwidth (BW) of the S2S links may be additive. For example, FIG. 1 shows four 32 GB/s links. This means that the maximum BW can be as high as 128 GB/s. When transactions go from one socket to another, the transactions can be address striped to distribute the data transfer across the four links. In this way, the BW may be efficiently utilized.

As indicated above, PCIe writes from a same source often must be completed in order. This means that any agents in a system should not be able to see stale value of address A while it is able to see an updated value of address B, where address B is younger than address A as issued by the PCIe agent, which is referred to as ordered write observation (OWO). For example, assume that a PCIe agent issues a write to address A followed by a write to address B. Then no other agents in the system should be in a position to see the update value of address B write, but still see the stale value of address A write.

Figure 2A:
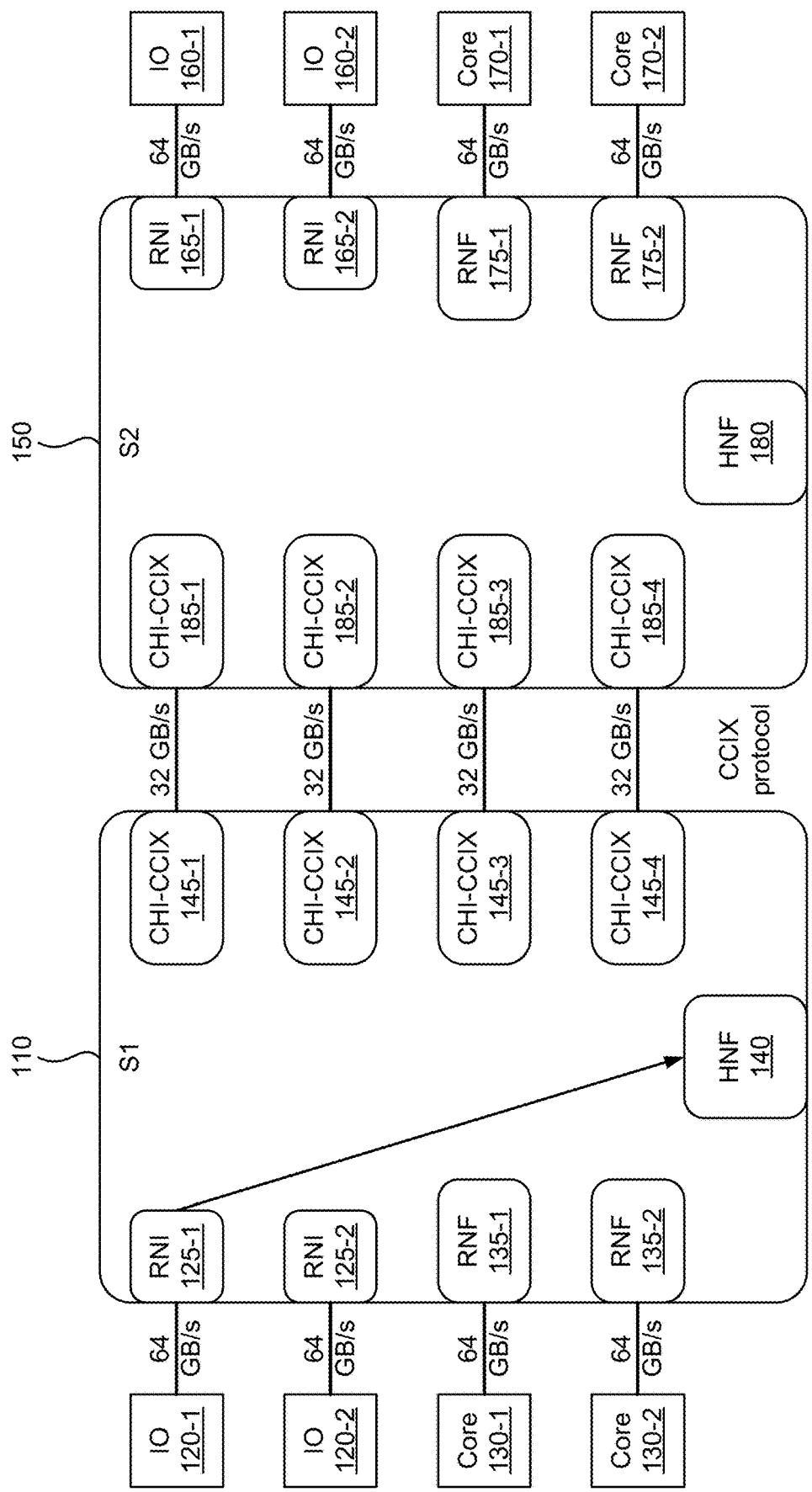
FIG. 2A illustrates a socket implementing an example of an on-socket transaction.
Figure 2B:
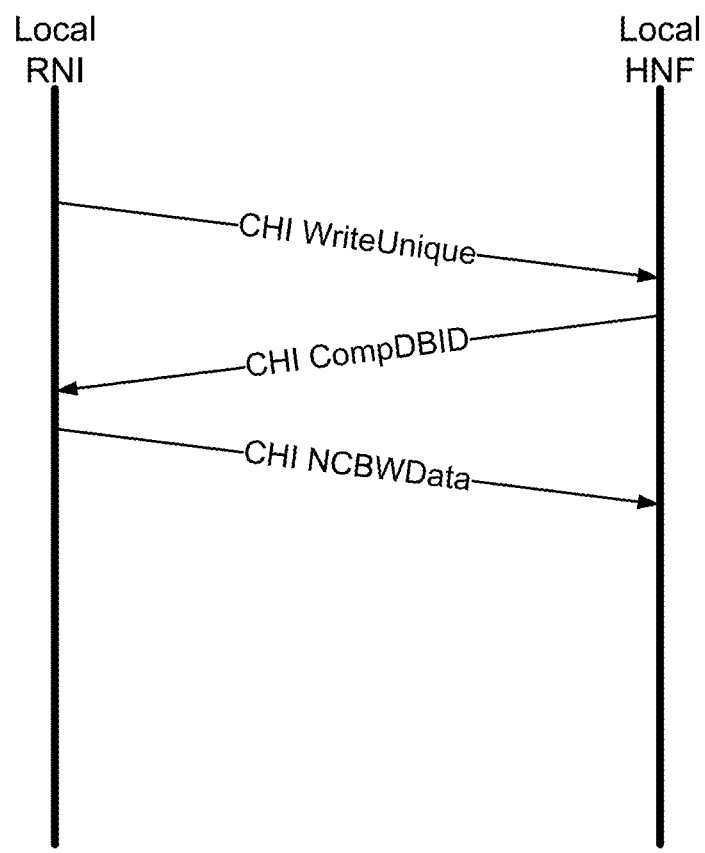
FIG. 2B illustrates a flow of on-socket transactions.

FIG. 2A illustrates an example of a CHI transaction, which is the on-chip coherence (e.g., intra-socket) protocol. As seen, it may be assumed that the IO agent 120-1 through the RNI 125-1 is writing data to memory accessible through the HNF 140. Note that from the perspective of the IO agent 120-1, the RNI 125-1 and the HNF 140 are both local, i.e., within the same socket. Thus, FIG. 2A may be viewed as an example of a local IO agent (e.g., IO agent 120-1) through a local RNI (e.g., RNI 125-1) writing data to local memory accessible through a local home node (e.g., HNF 140). FIG. 2B illustrates a CHI flow between the local RNI and the local HNF.

Local RNI (e.g., RNI 125-1) issues a WriteNoSnp (write no snoop) or a WriteUnique transaction to local HNF (e.g., HNF 140) (FIG. 2B illustrates that WriteUnique request is issued).

Local HNF issues a CompDBID response after it has competed necessary coherence resolutions and has a buffer ready to receive the write data.
  CompDBID response is a combined completion (Comp) and DBID (buffer ready for data) response.

Local RNI sends write data (NCBWData) for the address to local HNF. At this point, local RNI is completed the write transaction, and can move onto to next transaction.

Local HNF either writes to cache or to memory as needed.

The local RNI, which is the PCIe-CHI bridge, ensures OWO by not issuing the write data until completion response is received and write data has been sent out for the prior (older) write with which it needs to be ordered. Note that local writes work quite well since the latencies within a socket (e.g., within a chip or die) are quite low (e.g., within 10 s of nanoseconds). Thus, waiting for the completion response from the local home node before sending the next write is not too costly.

Figure 3A:
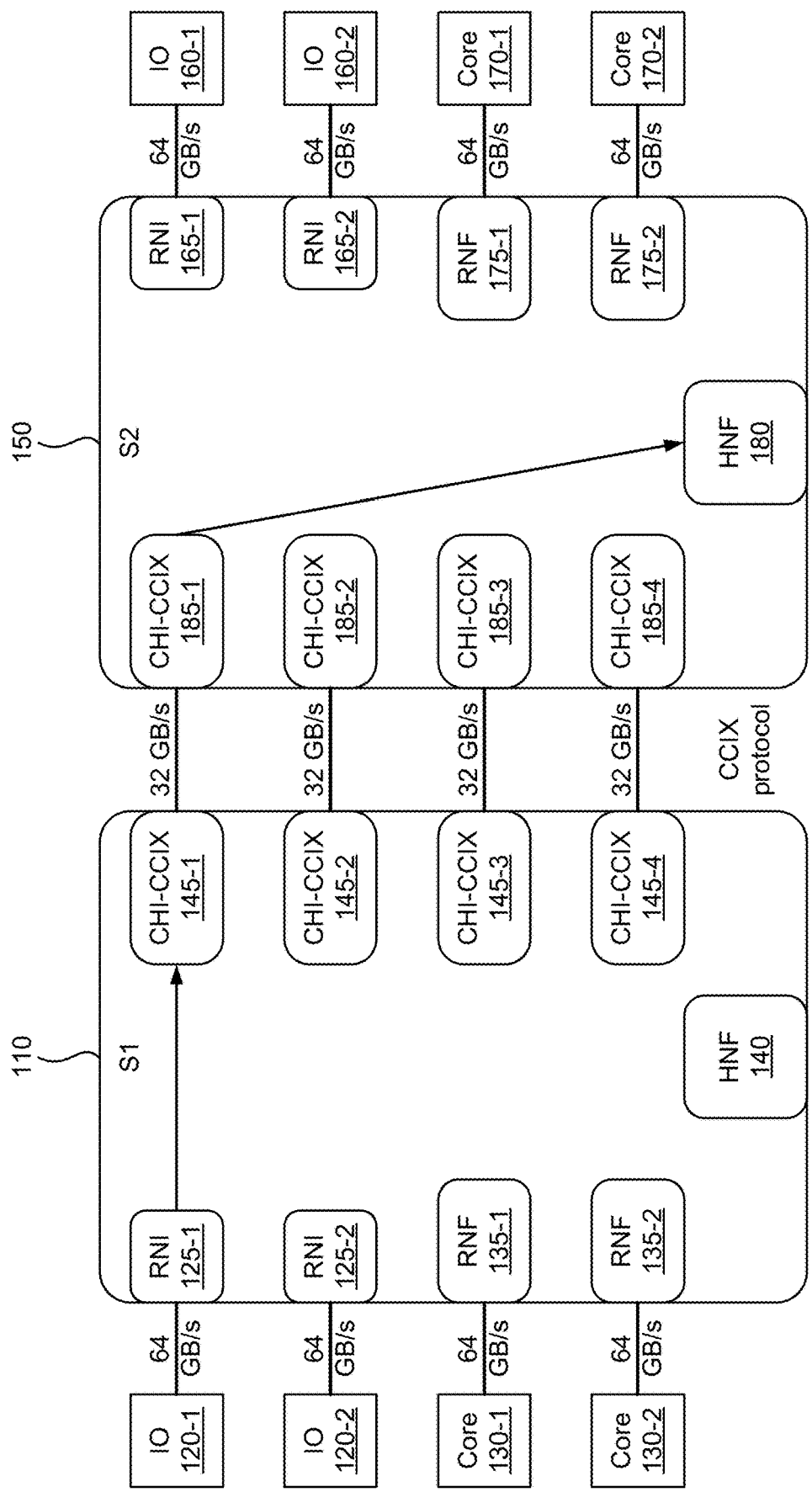
FIG. 3A illustrates local and remote sockets implementing a conventional socket-to-socket transaction.
Figure 3B:
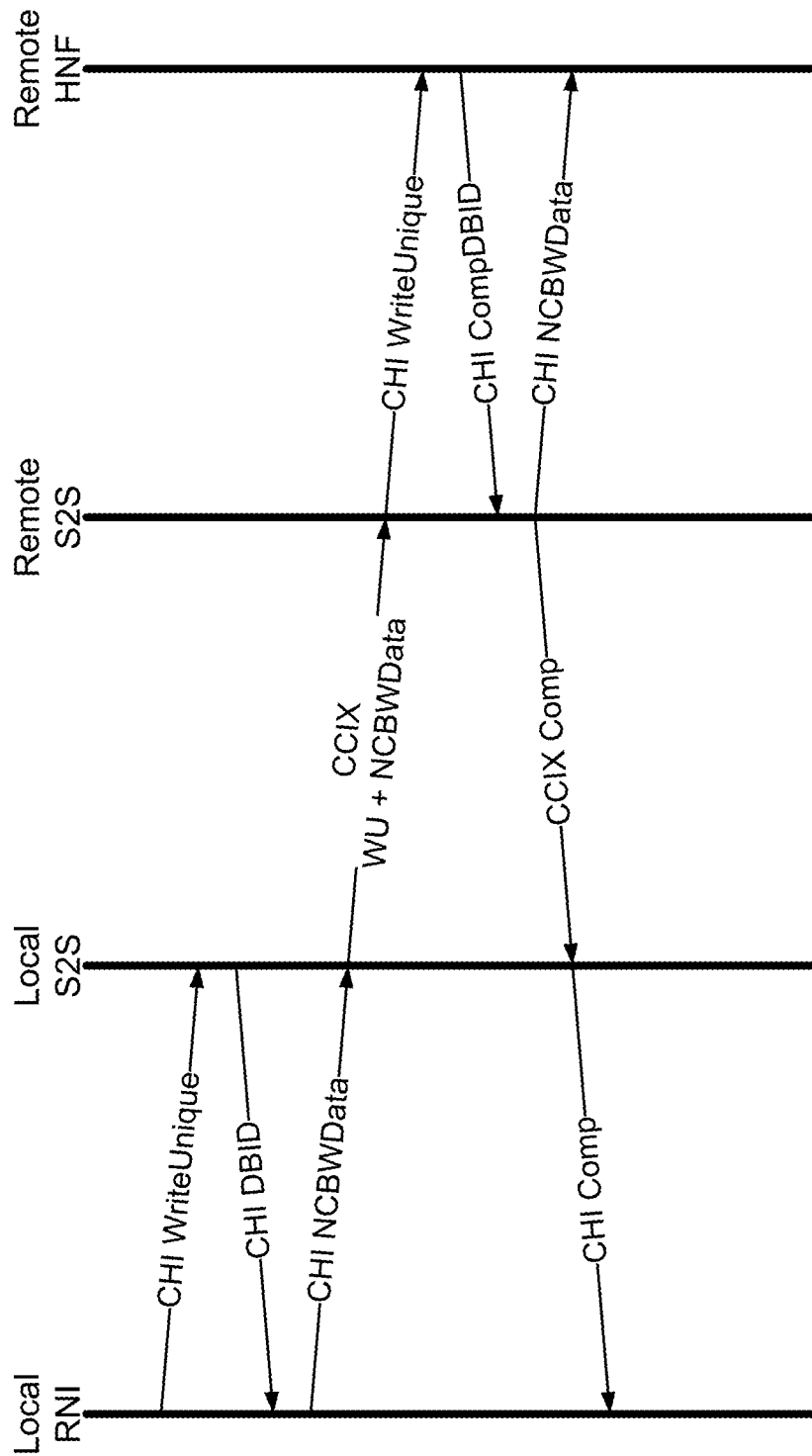
FIG. 3B illustrates a flow of conventional socket-to-socket transactions for one remote write.

FIG. 3A illustrates an example of a conventional CCIX transaction, which is the S2S (or inter-socket) coherence protocol. Here, it may be assumed that the IO agent 120-1 is writing data to memory accessible through the HNF 180 of a different socket 150. This means that the RNI 125-1, CCB 145-1, and CCB 185-1 are also involved. In this instance, from the perspective of the IO agent 120-1, the RNI 125-1 and the CCB 145-1 are local, but the CCB 185-1 and the HNF 180 are remote. Thus, writes from the IO agent 120-1 destined to HNF 180 are remote writes. FIG. 3B illustrates an example of conventional CCIX flow between the local RNI and the remote HNF for remote OWOs.

Local RNI (e.g., RNI 125-1) issues a WriteNoSnp (write no snoop) or a WriteUnique transaction to local S2S bridge (e.g., CCB 145-1) (FIG. 3B illustrates a WriteUnique for an address).

Local S2S bridge issues DBID response to local RNI when it has a buffer ready to receive the write data.
  Local CCB cannot issue a CompDBID response since the completion can only be sent from the remote home node (HNF 180 of second socket 150). This is because the only agent that can resolve the coherency is the remote home node.

Local RNI sends write data for the address to the local S2S bridge upon receiving the DBID response.

Local S2S bridge issues WriteNoSnp or WriteUnique plus the write data to remote S2S bridge (e.g., CCB 185-1). In socket-to-socket writes, combined write requests plus data can be sent.

Remote S2S bridge issues the WriteUnique transaction to remote HNF (e.g., HNF 180).
  Remote S2S bridge follows the CHI flow to home node on its socket, i.e., to HNF 180 (see CHI flow described above with respect to FIG. 2B).
Remote HNF issues a CompDBID to remote S2S bridge after it has competed necessary coherence resolutions and has a buffer ready to receive the write data.
Remote S2S bridge issues Comp to local S2S bridge. Remote S2S bridge also sends write data for the address to Remote HNF
Local S2S bridge issues Comp to local RNI. At this point, RNI 125-1 has completed the write transaction, and can move onto to next transaction.

Figure 3C:
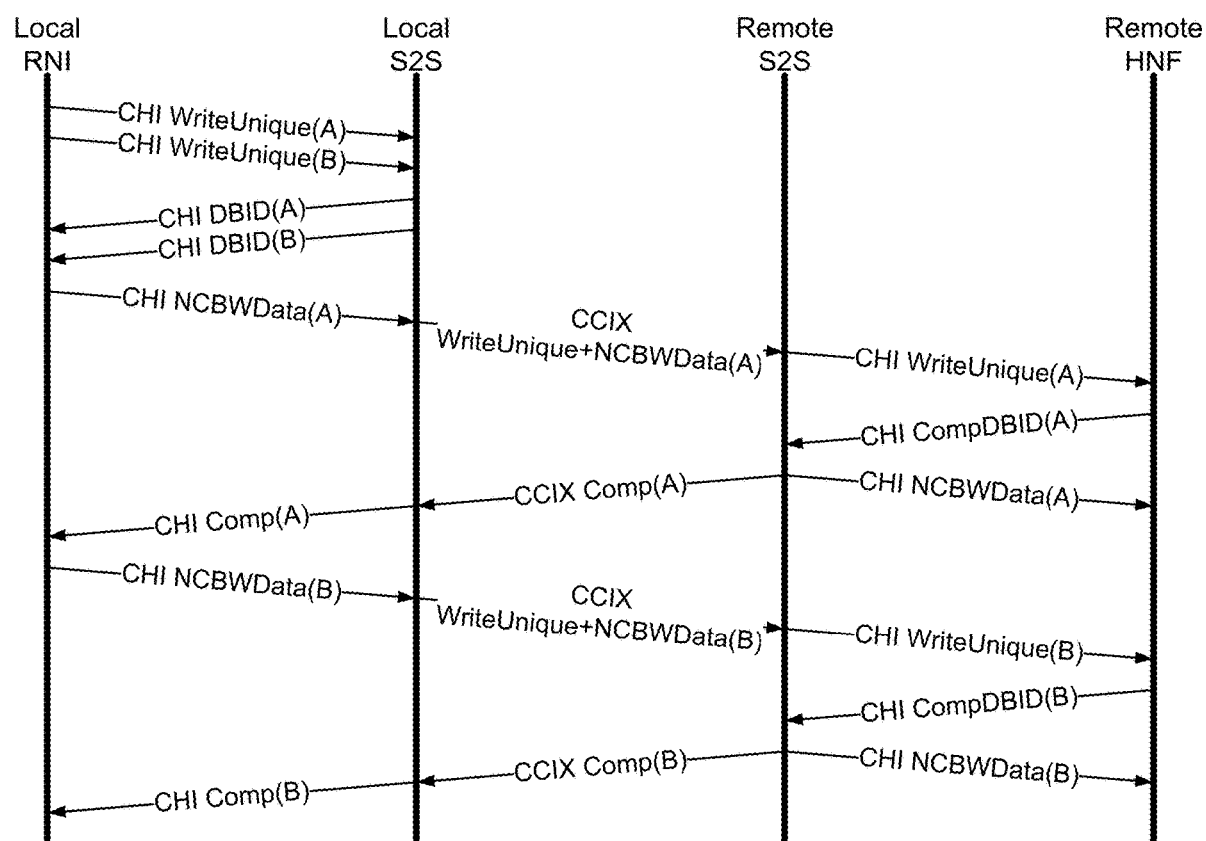
FIG. 3C illustrates a flow of conventional socket-to-socket transactions for multiple remote writes.

The local RNI (e.g., RNI 125-1) cannot move onto the next write transaction until the Comp is received for the prior transaction. This is illustrated in FIG. 3C showing an example of a conventional CCIX for multiple remote writes while maintaining OWO. In FIG. 3C, it is assumed that the local RNI sends a first write request WriteUnique(A) for a first address A, and then sends a second write request WriteUnique(B) for a second address B. For the first write, the local RNI can send the first data NCBWData(A) after receiving the first response DBIDResp(A) for the first write request WriteUnique(A). However, the local RNI must wait for a first completion Comp(A) for the first write request WriteUnique(A) is received before sending the second data NCBWData(B). The local RNI must wait because only the remote HNF can ensure that coherency for the writes to the remote memory is maintained. Waiting for completion for prior address writes before proceeding with next address write means that remote PCIe are effectively serialized. While local latencies are quite low, the inter-socket latencies can be quite high by comparison (e.g., 100 s of nanoseconds). Thus, even if the local RNI is ready to send the next data (due to the relatively low intra-socket latencies), the local RNI must wait (due to the relatively high inter-socket latencies). As a result, the BW is reduced substantially, which can be problematic.

Figure 4:
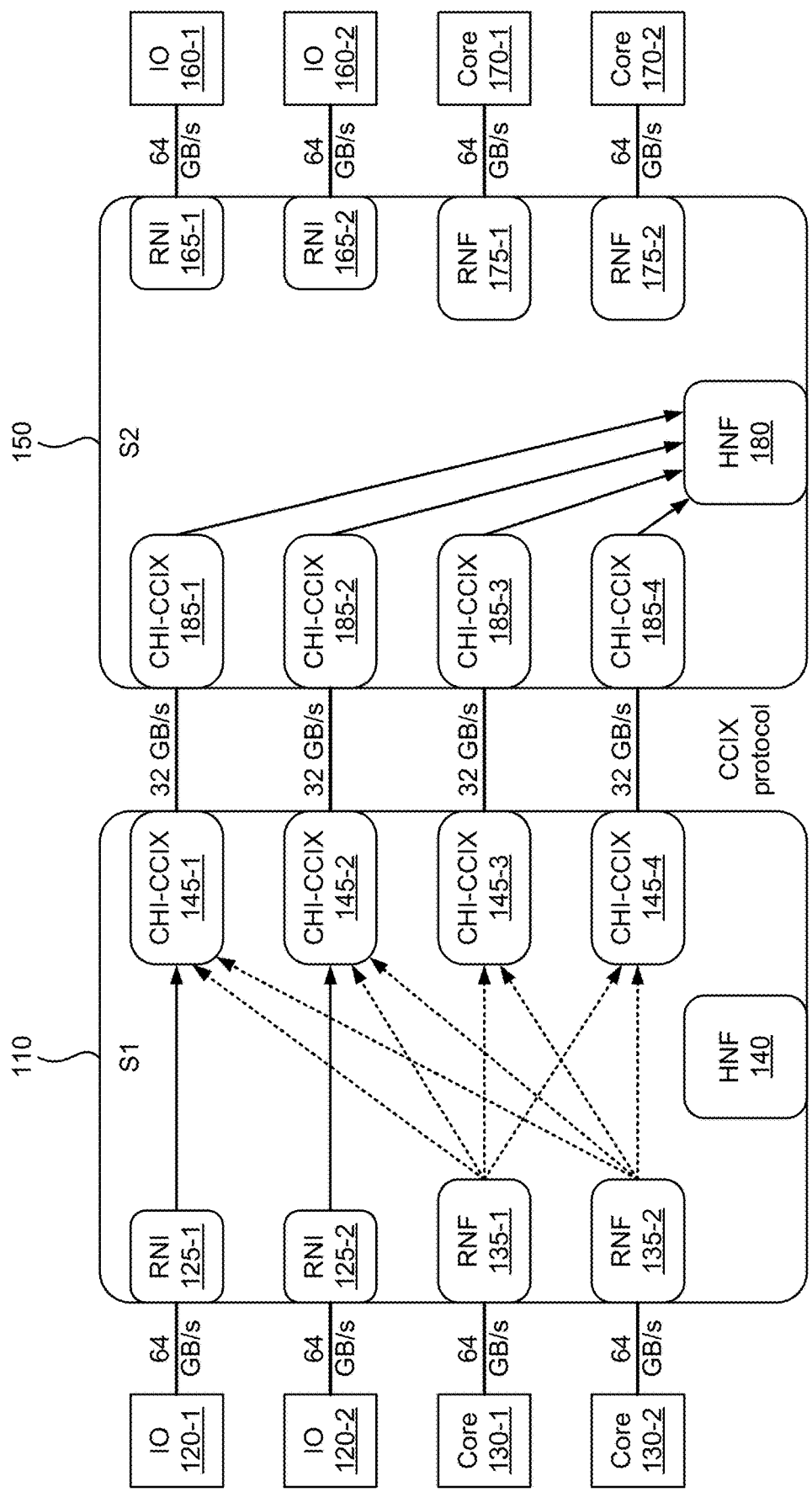
FIG. 4 illustrates local and remote sockets implementing an alternative socket-to-socket transaction.

FIG. 4 illustrates an alternate conventional OWO of remote PCIe writes that attempts to address the BW reduction. Here, when an RNI wishes to stream data remotely, the RNI sends all of the stream data to a single local S2S bridge, and that single S2S bridge in turn forwards the stream data to a single remote S2S bridge. For example, the RNI 125-1 of the first socket 110 may send all of the data to the CCB 145-1, which in turn sends the data to the CCB 185-1 of the second socket 150. Since the local RNI (e.g., RNI 125-1) is sending the data to the same local S2S bridge (e.g., CCB 145-1), then by sending the data in order, it can be sure that the local S2S bridge receives the data in order. Similarly, the local S2S bridge can ensure that a remote S2S bridge (e.g., CCB 185-1) receives the data in order by sending all of the data to the same remote S2S bridge. At the remote socket 150, the remote S2S bridge may use the CHI protocol (e.g., see flow FIG. 2B) to ensure that OWO is maintained.

Here, it is observed that if the writes are sent to the same local S2S bridge (e.g., from RNI 125-1 to CCB 145-1) and that order can be ensured in the local S2S bridge and the S2S transport, then by moving the local RNI write data ordering responsibilities to the remote S2S bridge (e.g., CCB 185-1), the burden of ordering can be shifted from the local socket to remote socket. In this instance, the local RNI can continue to send the write data to the local S2S bridge upon receiving the DBIDResp with the understanding that order will be maintained until the write reaches the remote S2S bridge.

This results in no serialization of writes at the local RNI. In effect, the local RNI streams the data to remote S2S bridge. The serialization is only with the remote S2S bridge. However, the latencies between the remote S2S bridge and the remote home node (e.g., HNF 180) is relatively low since these are "local" with each other.

This pushing of serialization to the remote S2S bridge has drawbacks. Note that all of the writes going to the remote S2S link must go through a single SSB link—between a single pair local and remote S2S bridges. This means that the BW is limited to the BW of a single S2S link. In FIG. 4, this means that BW at best be 32 GB/s, even though the IO agent 120-1 can stream to the RNI 125-1 at 64 GB/s.

Another drawback is that BW available to other agents can be reduced as well. For example, core agents are not limited to using a single SSB bridge to conduct remote transactions. The CPUs or cores can execute in any order, and thus are not normally subject to ordered writes since CPUs have synchronization capabilities to maintain proper order. Thus, in general, CPU accesses are hashed across multiple SSB bridges when remote transactions are involved.

A problem can arise if a CPU is performing remote transactions (e.g., reads, writes) and at the same time an IO agent 120 is streaming data to the remote HNF 180. Assume that the IO agent 120-1 is streaming data such that 90% of the BW between the local CCB 145-1 and the remote CCB 185-1 is being used by the data streaming while the remaining SSB bridges (CCB 145-2, 145-3, 145-4) have most of their BWs available. Also assume that a core agent (e.g., core agent 130-1) wishes to access the remote memory through the remote HNF 180. The corresponding RNF 135-1 may wish to equally distribute the remote transactions to all of the CCBs including CCB 145-1. Then to equally distribute the transactions, only 10% of the BW of each of the four CCBs may be utilized, even though three of the CCBs have much more than 10% available.

Figure 5A:
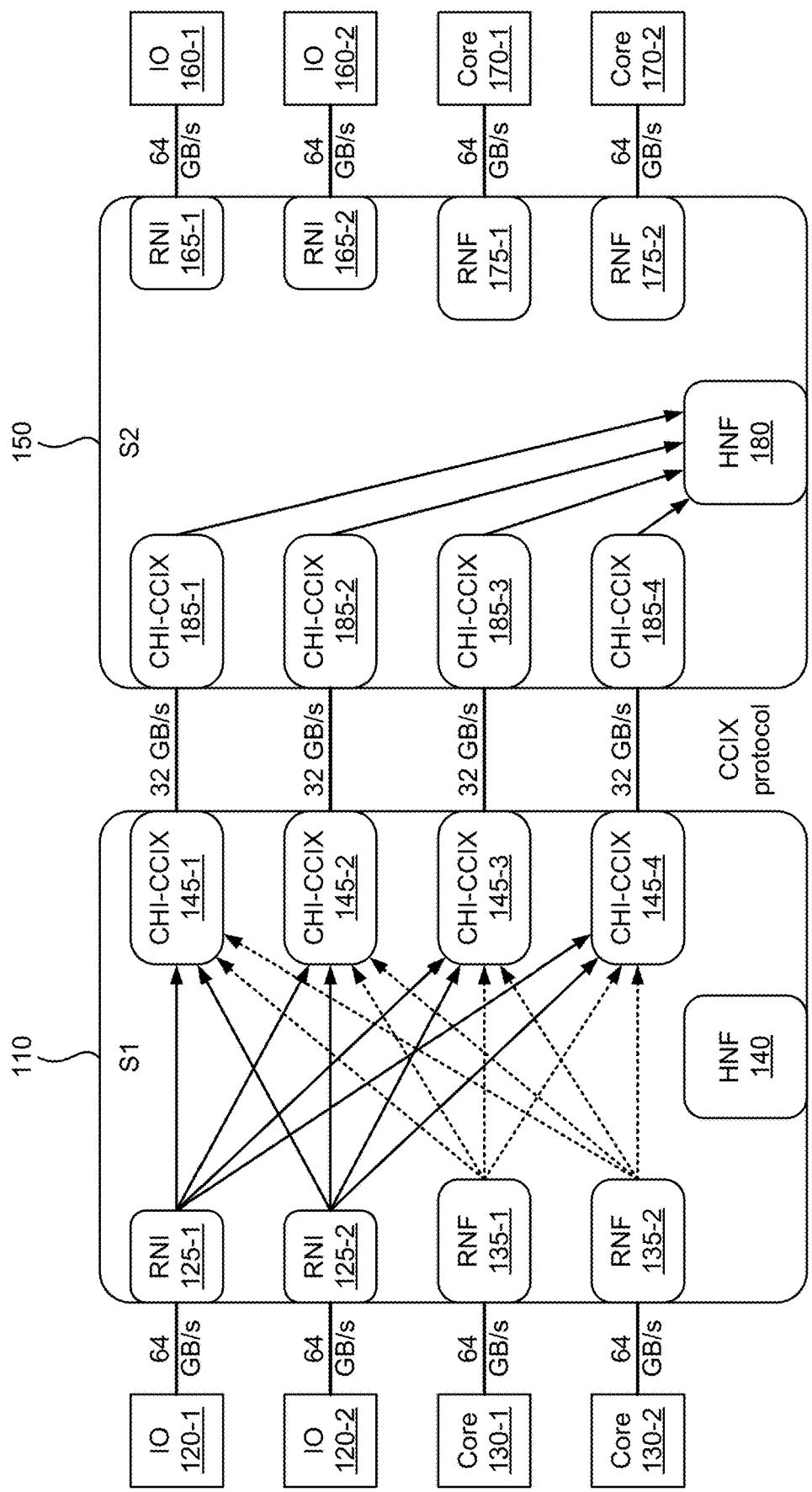
FIG. 5A illustrates local and remote sockets implementing a socket-to-socket in accordance with one or more aspects of the disclosure.

To address the issues related to conventional writes, it is proposed to stripe the ordered PCIe writes across multiple S2S links without requiring serialization of the writes. FIG. 5A illustrates an example of the proposed transaction. Generally, a local RNI may stripe the writes through multiple local S2S bridges. FIG. 5A illustrates the RNI 125-1 and RNI 125-2 each striping write data to all four CCBs 145-1, 145-2, 145-3, 145-4. In this way, the BWs of all S2S links may be utilized.

To accomplish such striping, in an aspect, the PCIe writes that comes to the local S2S bridge (e.g., through CCI WriteUnique, WriteNoSnp, etc.) may be broken into two transactions over CCIX: (1) CleanUnique, and (2) WriteBack. That is, when a local RNI issues a write transaction (e.g., CCI WriteUnique, CCI WriteNoSnp, etc.), the transaction may be broken into two transactions between sockets (CCIX CleanUnique, CCIX WriteBack) by the local CCB. It should be noted that both CleanUnique and WriteBack are existing CCIX transactions.

CleanUnique transaction ensures that all coherent copies of an address are cleaned out of caches and written to memory, with the home node registering that the local CCB is the unique owner (without data) of this address. A snoop filter (SF) in the remote home node stores this information (if present).
Once the ownership of the cache line is obtained by the local CCB, it can get the data from the local RNI by sending CompDBIDResp.

The local RNI may wait for all older writes to get their CompDBIDResp and send data in order. This completes the write at the local RNI.

The local CCB may send a WriteBack transaction over CCIX and wait for completion response (Comp) to actually complete the write.

The WriteBack is similar to normal WriteBack flow over CCIX. That is, dirty cache line is moved towards memopy, and the line is deallocated after transaction.

As mentioned, the proposed technique involves a local RNI striping ordered writes across multiple S2S links. That is, the proposed technique involves the local RNI sending write transactions to multiple local S2S bridges. For example, the local RNI (e.g., RNI 125-1) may send a first write transaction (e.g., WriteUnique, WriteBack, etc.) for a first address (e.g., address A) to a first local S2S bridge (e.g., CCB 145-1); send a second write transaction for a second address (e.g., address B) to a second local S2S bridge (e.g., CCB 145-1); send a third write transaction for a third address (e.g., address C) to a third local S2S bridge; and so on. However, it may be helpful to understand a flow involving a single local S2S bridge in isolation.

Figure 5B:
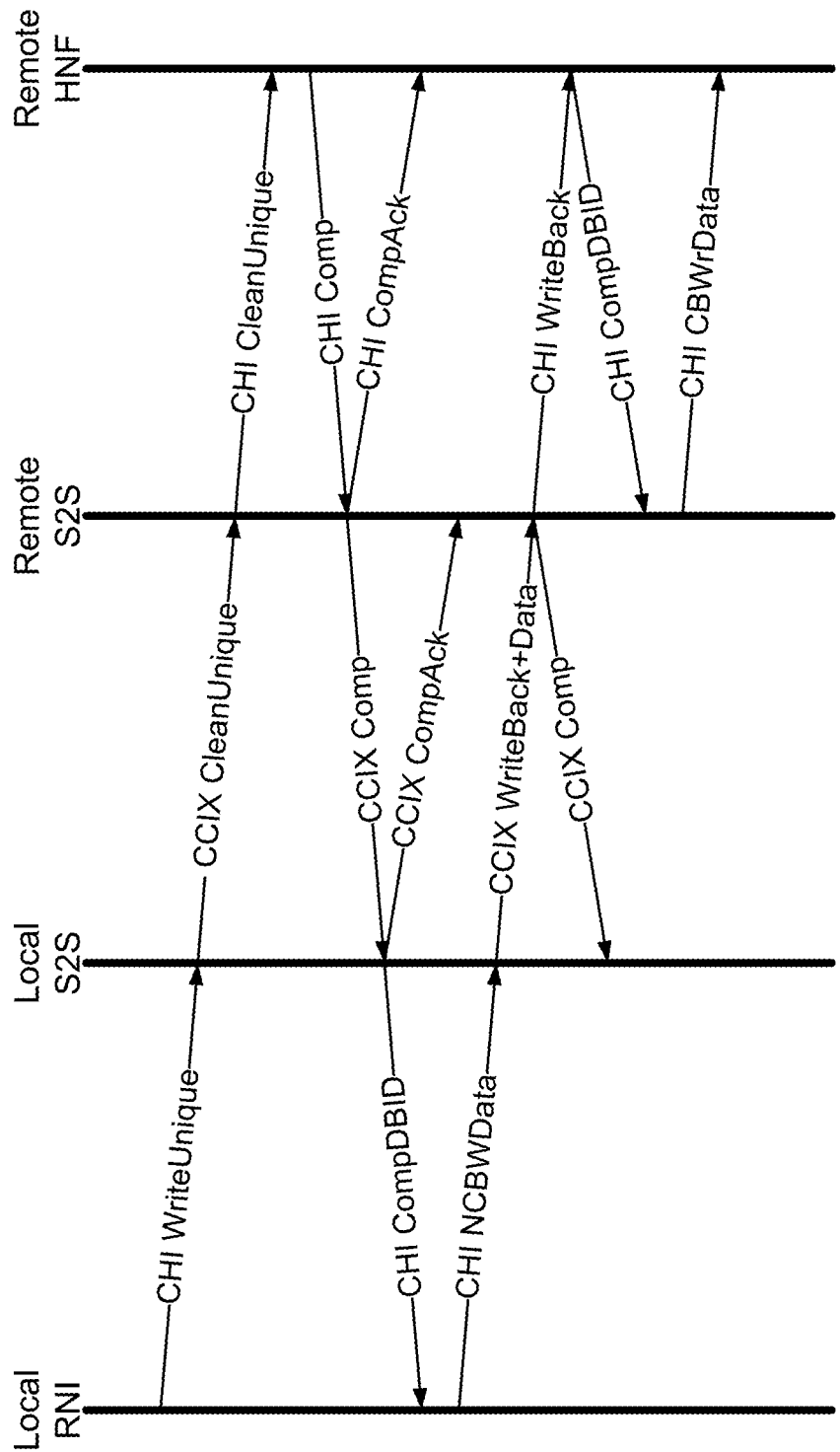
FIG. 5B illustrates a flow of socket-to-socket transactions for one remote write in accordance with one or more aspects of the disclosure.

FIG. 5B illustrates an example of the proposed remote write involving one local S2S bridge. In this figure, the transactions are prefaced with CHI (for intra-socket) or CCIX (for inter-socket) to indicate the transaction domain. However, for the descriptions below, if the context of the transaction is clear, then the preface may be left out.

In FIG. 5, it may be assumed that the local RNI (e.g., RNI 125-1) sends a write transaction (CHI WriteUnique) to a local S2S bridge (e.g., CCB 145-1) for an address. Upon receiving the CHI WriteUnique, the local S2S bridge may send a CCIX CleanUnique to a remote S2S bridge (e.g., CCB 185-1) instead of sending a CHI DBID response right back to the local RNI as in conventional flow (see FIG. 3B).

Upon receiving the CCIX CleanUnique, the remote S2S bridge may send a CHI CleanUnique to the remote home node (e.g., HNF 180). Upon receiving the CHI CleanUnique, the remote home node may perform actions to ensure coherence for caches and memories regarding the address. The remote home node may then send a CHI Comp response indicating a completion back to the remote S2S bridge.

Upon receiving the CHI Comp response, the remote S2S bridge may send a CCIX Comp response to the first local S2S bridge. In effect, the remote S2S bridge may forward the completion response for the address from the remote home node back to the local S2S bridge.

Since the coherency for the address is resolved, the local S2S bridge may send a CompDBID response (combination response indicating completion of coherency of the address and a buffer data) to the local RNI. The local RNI, upon receiving the CompDBID for the address, may send CHI NCBWData, which is the data for the address, to the local S2S bridge, which may then send a WriteBack+Data to the remote S2S bridge. The first remote S2S bridge may send a CHI WriteBack to the remote home node, which may respond with CHI CompDBID response, and the remote S2S bridge may send the data for the address through a CHI CBWrData transaction.

Note that in FIG. 5B, the CleanUnique transaction from the local S2S bridge goes all the way to the remote home node, which resolves coherence and ensures that all copies of the data for the address are cleaned. In other words, all other copies of the cache line corresponding to the address are cleaned, and any dirty copies that exist anywhere are updated to main memory. In short, no dirty copies of the data will be in the cache.

The remote home node then issues the Comp response (CHI Comp) to the remote S2S bridge, which in turn forwards the Comp response (CCIX Comp) to the local S2S bridge. The local S2S bridge may then issue the CompDBID response (CHI CompDBID) to the local RNI (e.g., RNI 125-1) to write the data for the address. Thus, in the proposed technique, the local S2S bridge (any one or more of local CCBs 145) breaks the write transaction from the local RNI into two transactions: first to ensure coherency and ownership of the cache line and/or memory corresponding to the address to the local S2S bridge (e.g., through the CleanUnique transaction), and second to send the write data for the address (e.g., through the WriteBack transaction) to the remote home node (via the remote S2S bridge) once the coherency is ensured (e.g., when the CompDBID response is received).

Figure 5C:
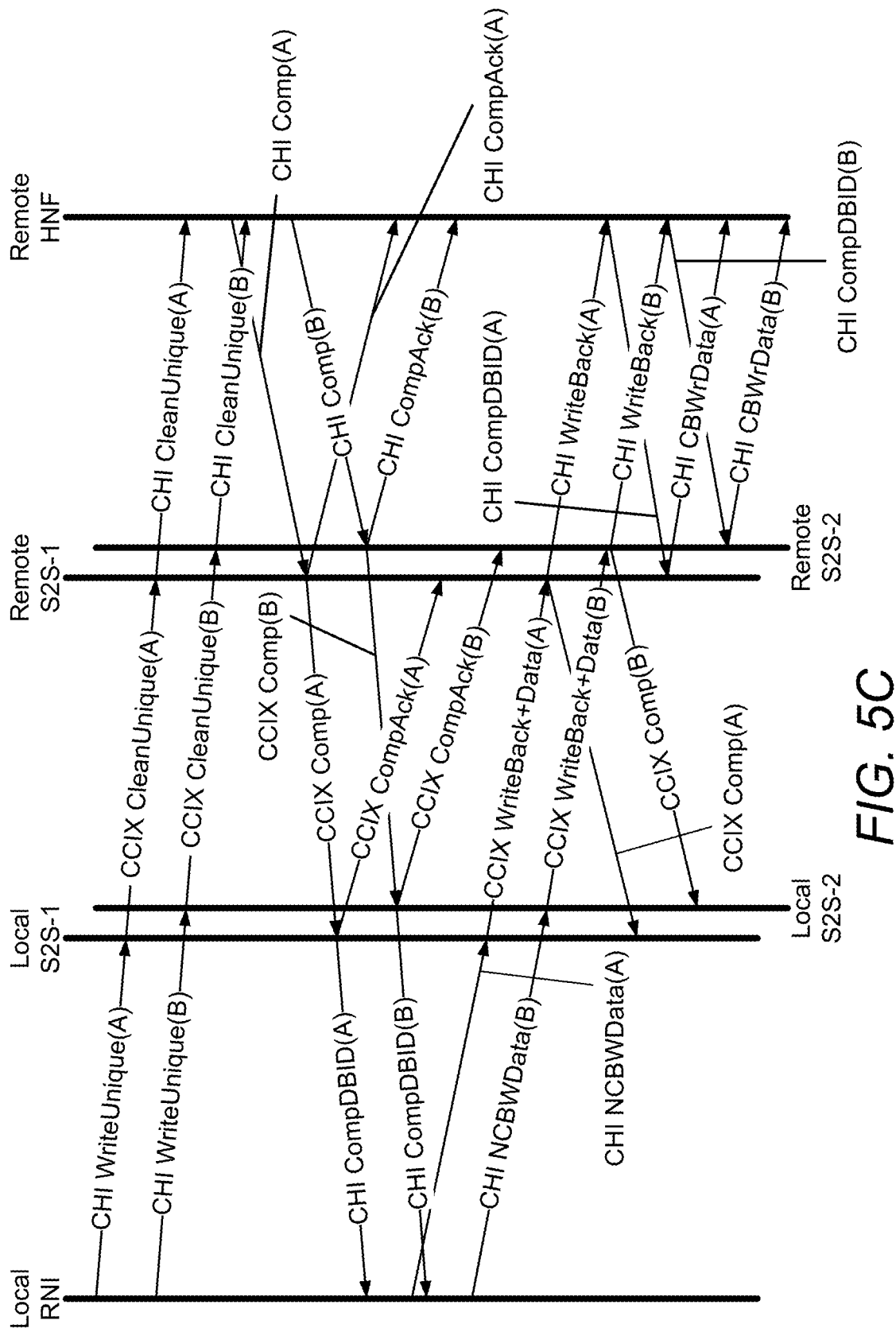
FIG. 5C illustrates a flow of socket-to-socket transactions for multiple remote writes in accordance with one or more aspects of the disclosure.

FIG. 5C expands upon FIG. 5B in that FIG. 5C illustrates a local RNI striping the write data across multiple S2S links, i.e., send the write data for multiple addresses to multiple local S2S bridges. In this way, the combined BW of the multiple S2S links may be utilized by one local RNI. FIG. 5C illustrates a flow of transactions to perform remote writes for two addresses A and B from a local RNI of a local socket (e.g, socket 110) to a memory accessible through a remote home node of a remote socket (e.g., socket 150).

As seen, the local RNI (e.g., RNI 125-1) may send a first write transaction for the first address A (CHI WriteUnique (A)) to a first local S2S bridge (e.g., CCB 145-1). Thereafter, the local RNI may send a second write transaction for the second address B (CHI WriteUnique(B)) to a second local S2S bridge (e.g., CCB 145-2). Since transaction for address A is sent before address B, address A may be assumed to be older of the two.

Upon receiving CHI WriteUnique(A), the first local S2S bridge may send a CCIX CleanUnique(A) to a first remote S2S bridge (e.g., CCB 185-1). Again, this is different from the conventional technique in which the local S2S bridge sends a CHI DBID response right back to the local RNI (see FIG. 3B). Likewise, upon receiving the CHI WriteUnique (B), the second local S2S bridge may send a CCIX CleanUnique(B) to a second remote S2S bridge (e.g., CCB 185-2) instead of sending a CHI DBID response right back to the local RNI.

Upon receiving the CCIX CleanUnique(A), the first remote S2S bridge may send a CHI CleanUnique(A) to the remote home node (e.g., HNF 180). Likewise, upon receiving the CCIX CleanUnique(B), the second remote S2S bridge may send a CHI CleanUnique(B) to the remote home node.

Upon receiving the CHI CleanUnique(A), the remote home node may perform actions to ensure coherency for caches and memories regarding the first address A, and may send a CHI Comp(A) response back to the first remote S2S bridge. Similarly, upon receiving the CHI CleanUnique(B), the remote home node may perform actions to ensure coherence for caches and memories regarding the second address B, and may send a CHI Comp(B) response back to the second remote S2S bridge.

Upon receiving the CHI Comp(A) response, the first remote S2S bridge may send a CCIX Comp(A) response to the first local S2S bridge. In effect, it may be said that the first remote S2S bridge may forward the completion response for address A from the remote home node back to the first local S2S bridge. Likewise, upon receiving the CHI Comp(B) response, the second remote S2S bridge may send a CCIX Comp(B) response to the second local S2S bridge. In effect, it may be said that the second remote S2S bridge may forward the completion response for address B from the remote home node back to the second local S2S bridge.

The CCIX Comp(A) response indicates that the coherency for the first address A is resolved. Thus, upon receiving the CCIX Comp(A) response, the first local S2S bridge may send a CompDBID(A) response to the local RNI. This is instead of just responding with DBID (for data buffer ready) as in the conventional flow (see FIG. 3B). Similarly, the CCIX Comp(B) response indicates that the coherency for the second address B is resolved. Thus, upon receiving the CCIX Comp(B) response, the second local S2S bridge may send a CompDBID(B) response to the local RNI.

The local RNI, upon receiving the CompDBID(A), may respond by sending data for the first address (CHI NCBWData(A) to the first local S2S bridge, which may then send a WriteBack+Data(A) to the first remote S2S bridge. The first remote S2S bridge may send a CHI WriteBack(A) to the remote home node, which may respond with CHI CompDBID(A) response, and the first remote S2S bridge may send the data for the first address through a CHI CBWrData(A) transaction.

The local RNI, upon receiving the CompDBID(B), may respond by sending the data (CHI NCBWData(B) (after observing that the completion for the older write has been received) to the second local S2S bridge, which may then send a WriteBack+Data(B) to the second remote S2S bridge. The second remote S2S bridge may send a CHI WriteBack(B) to the remote home node, which may respond with CHI CompDBID(B) response, and the second remote S2S bridge may send the data for the second address through a CHI CBWrData(B) transaction.

Referring back to FIG. 5B, if the flow illustrated in FIG. 5B is viewed in isolation, it may appear that turning a single CHI write (from the local RNI) into two CCIX transactions (by the local S2S bridge) would cause longer delays. This can be true when individual writes are concerned. For example, the flow in FIG. 3B (illustrating a conventional PCIe transactions for a single remote write) would appear to have smaller latency than the flow illustrated in FIB. 5B. This is because the protocol traffic over CCIX is increased due to the added REQ and RSP transactions rather than data transaction.

However, one performance benefit is that for a single S2S link (link between one local S2S bridge and one remote S2S bridge) comes from being able to stream CleanUnique to the remote socket and sending CompDBID response (coherence completion and data buffer ready combination response) to the local RNI once the CleanUnique is completed. Another performance benefit comes from being able to use multiple (some or all) S2S links by striping the address across the multiple S2S links. In this way, combined BW of the multiple links may be utilized (compare this with BW available with alternate conventional method illustrated in FIG. 4).

As seen in FIG. 5C, note that CleanUnique for address B is started while the CleanUnique for address A is still being performed. That is, the performance of the CleanUnique transactions for multiple addresses can overlap in time. In effect, this introduces some level of parallelism into proposed technique.

When the local RNI receives the CompDBID response for an address, the local RNI may immediately send the write data for the address since it is assumed that the coherency for the address has been established. That is, as seen in FIG. 5C, the local RNI may send the write data for address A CHI NCBWData(A) upon receiving CHI CompDBID(A). The local RNI may send the write data for address B (CHI NCBWData(B)) upon receiving CHI CompDBID(B) (after observing that the completion for the older write has been received) to the respective local S2S bridges. That is, the remote write for address B may be started while the remote write for address A is being performed.

In an aspect, as an additional measure to ensure order, if the local RNI receives CHI CompDBID(B) from the second local S2S bridge before receiving CHI CompDBID(A) from the first local S2S bridge, the local RNI may simply wait to receive CHI CompDBID(A). Thereafter, the local RNI may send CHI NCBWData(A) to the first local S2S bridge, and then send CHI NCBWData(B) to the second local S2S bridge. That is, the local RNI may be configured such that when CompDBID for a younger address is received before CompDBID for an older address, the local RNI may wait to receive the CompDBID for the older address, and then send NCBWData for the older address before sending NCBWData for the younger address.

In summary, the proposed techniques enable following technical advantages:
- Not requiring serialization of write data to the local CCBs results in maximizing the PCIe write BW through a single S2S link.
- Allow local RNI to send writes through multiple (some or all) S2S links (e.g., through address striping) allows the IO agent to make use of sum of the S2S link bandwidth.
- When both RNF and RNI are accessing the memory (e.g., DDR, NVMEM, etc.) of the remote socket, detrimental effects to the RNF (e.g., to CPU core) of limiting the RNI to a single S2S link is avoided.

In general, the proposed techniques enable striping the order PCIe writes across multiple S2S CCIX links without requiring serialization of the writes.

Figure 6:
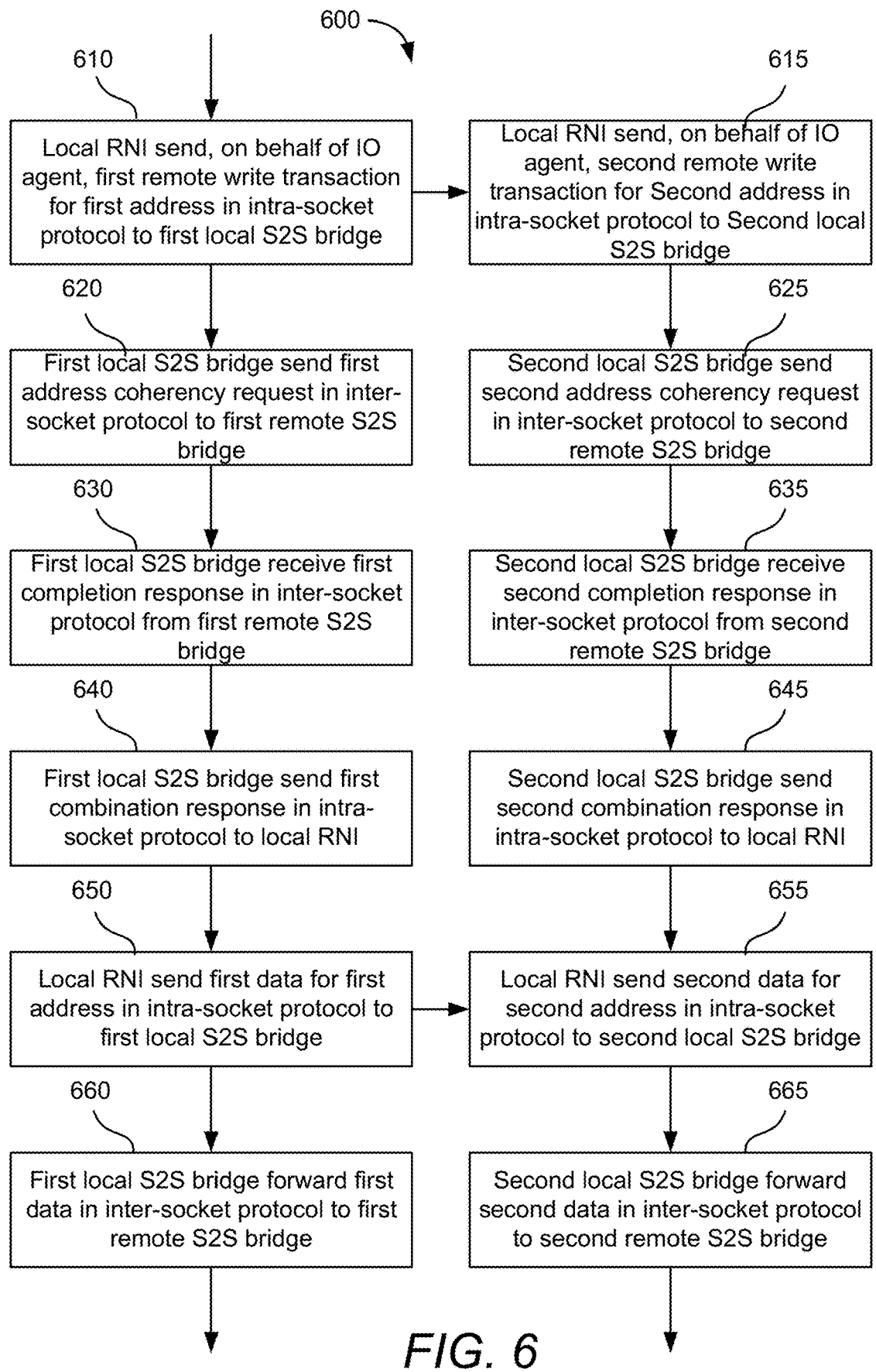
FIG. 6 illustrates a flow chart of an example method of conducting socket-to-socket transactions for remote writes.

FIG. 6 illustrates a flow chart of an example method 600 of performed by components of the local socket. It should be noted that the terms "local" and "remote" are relative from the perspectives of the agents (IO agents, core agents, etc.). That is, from the perspectives of IO agents 120 and the core agents 130, the socket 110 is local and the socket 150 is remote. But from the perspectives of IO agents 160 and the core agents 170, the socket 150 is local and the socket 110 is remote. Thus, the components of both sockets 110 and 150 may be configured to perform the method 600.

However, for ease of reference, it will be assumed that the socket 110 is the local socket. In block 610, a local RNI (e.g., RNI 125-1) may send, on behalf of an IO agent (e.g., IO agent 120-1), a first remote write transaction for a first address (e.g., address A) in an intra-socket protocol to a first local S2S bridge (e.g., CCB 145-1). Recall that CHI is an example of the intra-socket protocol. The first remote write transactions may be CHI WriteUnique, CHI WriteNoSnp, etc., which are currently existing transactions in the CHI protocol.

In block 620, upon receiving the first remote write transaction from the local RNI, the first local S2S bridge may send a first address coherency request in an inter-socket protocol to a first remote S2S bridge (e.g., CCB 185-1). In an aspect, the first address coherency request be a request to clean all coherent copies of the first address out of one or more caches and written to memory. Recall that CCIX is an example of the inter-socket protocol. The first address coherency request may be CCIX CleanUnique, which is an existing transaction of the CCIX protocol.

Note that the first local S2S bridge does not behave conventionally upon receiving the first remote write transaction is received. That is, the first local S2S bridge does NOT immediately send a data buffer ready (e.g., CHI DBID) response to the local RNI when the first remote write transaction is received.

Subsequent to sending the first address coherency request to the first remote S2S bridge, in block 630, the first local S2S bridge may receive a first completion response in the inter-socket protocol from the first remote S2S bridge. The first completion response may be a response indicating that the coherency for the first address is completed. The first completion response may be CCIX Comp, which is an existing transaction of the CCIX protocol.

Upon receiving the first completion response from the first remote S2S bridge, in block 640, the first local S2S bridge may send a first combination response in the intra-socket protocol to the local RNI. The first combination response may indicate that the coherency for the first address is completed and a buffer is ready to receive a first data for the first address. The first combination response may be CHI CompDBID, which is an existing transaction of the CHI protocol.

Upon receiving the first combination response from the first local S2S bridge, in block 650, the local RNI may send a first data for the first address in the intra-socket protocol to the first local S2S bridge. The first data may be sent in CHI NCBWData, which is an existing transaction of the CHI protocol.

Upon receiving the first data from the local RNI, in block 660, the first local S2S bridge may forward the first data in the inter-socket protocol to the first remote S2S bridge. The first data may be forwarded in a first writeback transaction, which is an example of a write transaction. The first writeback transaction may be CCIX WriteBack+Data, which is an existing transaction in the CCIX protocol.

After sending the first remote write transaction, in block 615, the local RNI may also send, on behalf of the IO agent, a second remote write transaction for a second address (e.g., address B) in the intra-socket protocol to a second local S2S bridge (e.g., CCB 145-2). The second remote write transactions may be a CHI WriteUnique, a CHI WriteNoSnp, etc.

In block 625, upon receiving the second remote write transaction from the local RNI, the second local S2S bridge may send a second address coherency request in the inter-socket protocol to a second remote S2S bridge (e.g., CCB 185-1). In an aspect, the second address coherency request may be a request to clean all coherent copies of the second address out of one or more caches and written to memory. The second address coherency request may be CCIX CleanUnique. Note that the second local S2S bridge also does not behave conventionally upon receiving the second remote write transaction is received.

Subsequent to sending the second address coherency request to the second remote S2S bridge, in block 635, the second local S2S bridge may receive a second completion response in the inter-socket protocol from the second remote S2S bridge. The second completion response may be a response indicating that the coherency for the second address is completed. The second completion response may be CCIX Comp.

Upon receiving the second completion response from the second remote S2S bridge, in block 645, the second local S2S bridge may send a second combination response in the intra-socket protocol to the local RNI. The second combination response may indicate that the coherency for the second address is completed and a buffer is ready to receive a second data for the second address. The second combination response may be CHI CompDBID.

Upon receiving the second combination response from the second local S2S bridge, in block 655, the local RNI may send a second data for the second address in the intra-socket protocol to the second local S2S bridge. The second data may be sent in CHI NCBWData.

Upon receiving the second data from the local RNI, in block 665, the second local S2S bridge may forward the second data in the inter-socket protocol to the second remote S2S bridge. The second data may be forwarded in a second writeback transaction. The second writeback transaction may be CCIX WriteBack+Data.

In an aspect, the local RNI may send the second remote write transaction to the second local S2S bridge after sending the first remote write transaction to the first local S2S bridge. In other words, the second address may be younger than the first address. In this instance, if the local RNI receives the second combination response from the second local S2S bridge before receiving the first combination response from the first local S2S bridge, then the local RNI may be configured to wait for the first combination response. Thereafter, the local RNI may send the first data for the first address to the first local S2S bridge, and then send the second data for the first address to the second local S2S bridge.

Figure 7:
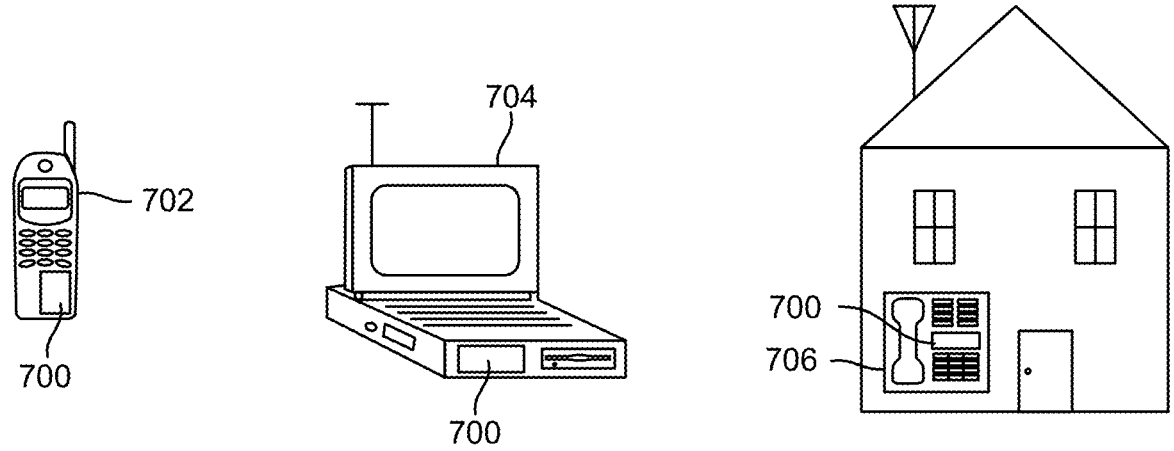
FIG. 7 illustrates various electronic devices which may utilize one or more aspects of the disclosure.

FIG. 7 illustrates various electronic devices 700 which may utilize one or more aspects of the disclosure. For example, a mobile phone device 702, a laptop computer device 704, and a terminal device 706 may include the local and/or remote sockets 110, 150. The devices 702, 704, 706 illustrated in FIG. 7 are merely exemplary. Other electronic devices may also include, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), an Internet of things (IoT) device or any other device that stores or retrieves data or computer instructions or any combination thereof Implementation examples are described in the following numbered clauses:

Clause 1: A local socket, comprising: one or more local input-output (IO) coherence request nodes (RNI) configured to communicate with corresponding one or more IO agents, the one or more local RNIs comprising a local RNI configured to communicate with an IO agent; and a plurality of local socket-to-socket (S2S) bridges configured to communicate with corresponding remote S2S bridges of a remote socket, the plurality of local S2S bridges comprising a first local S2S bridge configured to communicate with a first remote S2S bridge, wherein the local RNI is configured to send, on behalf of the IO agent, a first remote write transaction for a first address in an intra-socket protocol to the first local S2S bridge, wherein the first local S2S bridge is configured to: send a first address coherency request in an inter-socket protocol to a first remote S2S bridge of the remote socket upon receiving the first remote write transaction, the first address coherency request being a request to clean all coherent copies of the first address out of one or more caches and written to memory; receive a first completion response in the inter-socket protocol from the first remote S2S bridge subsequent to sending the first address coherency request, the first completion response being a response indicating that a coherency for the first address is completed; and send a first combination response in the intra-socket protocol to the local RNI upon receiving the first completion response, the first combination response indicating that the coherency for the first address is completed and a buffer is ready to receive a first data for the first address, wherein the local RNI is further configured to send the first data for the first address in the intra-socket protocol to the first local S2S bridge upon receiving the first combination response, and wherein the first local S2S bridge is further configured to forward the first data as a write transaction in the inter-socket protocol to the first remote S2S bridge upon receiving the first data.

Clause 2: The local socket of clause 1, wherein the intra-socket protocol is a Coherent Hub Interconnect (CHI) protocol, wherein the inter-socket protocol is a Cache Coherent Interconnect for Accelerators (CCIX) protocol, or both.

Clause 3: The local socket of clause 2, wherein the first remote write transaction is a CHI WriteUnique or a CHI WriteNoSnp for the first address, wherein the first address coherency request is a CCIX CleanUnique transaction for the first address, wherein the first completion response is a CCIX Comp transaction for the first address, wherein the first combination response is a CHI CompDBID transaction for the first address, wherein the first data is sent in a CHI NCBWData transaction for the first address, wherein the first data is forwarded in a CCIX WriteBack+Data transaction for the first address, or any combination thereof Clause 4: The local socket of any of clauses 1-3, wherein the one or more local RNIs and the plurality of local S2S bridges are comprised on a single die or a system-on-chip (SoC).

Clause 5: The local socket of clause 4, wherein the single die or SoC also comprises the one or more IO agents.

Clause 6: The local socket of any of clauses 4-5, wherein the local socket and the remote socket are separate dies or SoCs.

Clause 7: The local socket of any of clauses 1-6, wherein none of the one or more local RNIs comprises any hardware-coherent cache.

Clause 8: The local socket of clause 7, further comprising: one or more local fully coherent request nodes (RNF) configured to communicate with one or more core agents, wherein the one or more local RNFs do comprise one or more hardware coherent caches.

Clause 9: The local socket of any of clauses 1-8, wherein the plurality of local S2S bridges further comprises a second local S2S bridge configured to communicate with a second remote S2S bridge, wherein the local RNI is configured to send, on behalf of the IO agent, a second remote write transaction for a second address in the intra-socket protocol to the second local S2S bridge, wherein the second local S2S bridge is configured to: send a second address coherency request in the inter-socket protocol to the second remote S2S bridge upon receiving the second remote write transaction, the second address coherency request being a request to clean all coherent copies of the second address out of one or more caches and written to memory; receive a second completion response in the inter-socket protocol from the second remote S2S bridge subsequent to sending the second address coherency request, the second completion response being a response indicating that a coherency for the second address is completed; and send a second combination response in the intra-socket protocol to the local RNI upon receiving the second completion response, the second combination response indicating that the coherency for the second address is completed and a buffer is ready to receive a second data for the second address, wherein the local RNI is further configured to send the second data for the second address in the intra-socket protocol to the second local S2S bridge upon receiving the second combination response, and wherein the second local S2S bridge is further configured to forward the second data in the inter-socket protocol to the second remote S2S bridge upon receiving the second data.

Clause 10: The local socket of clause 9, wherein the local RNI sends the second remote write transaction after sending the first remote write transaction, and wherein if the local RNI receives the second combination response before the first combination response, the local RNI is configured to wait until the first combination response is received, send the first data for the first address to the first local S2S bridge after receiving the first combination response, and send the second data for the second address to the second local S2S bridge after sending the first data to the first local S2S bridge.

Clause 11: The local socket of any of clauses 9-10, wherein the intra-socket protocol is a Coherent Hub Interconnect (CHI) protocol, the inter-socket protocol is a Cache Coherent Interconnect for Accelerators (CCIX) protocol, or both, and wherein any combination of the following are true: the second remote write transaction is a CHI WriteUnique or a CHI WriteNoSnp for the second address, the second address coherency request is a CCIX CleanUnique transaction for the second address, the second completion response is a CCIX Comp transaction for the second address, the second combination response is a CHI CompDBID transaction for the second address, the second data is sent in a CHI NCBWData transaction for the second address, and the second data is forwarded in a CCIX WriteBack+Data transaction for the second address.

Clause 12: The local socket of any of clauses 1-11, wherein the local socket is incorporated into an apparatus selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, an Internet of things (IoT) device, a laptop computer, a server, and a device in an automotive vehicle.

Clause 13: A method of a local socket, the method comprising: sending, by a local input-output (IO) coherence request node (RNI) on behalf of an IO agent, a first remote write transaction for a first address in an intra-socket protocol to a first local S2S bridge, the local RNI being one of one or more local RNIs of the local socket configured to communicate with corresponding one or more IO agents, and the first local S2S bridge being one of a plurality of local S2S bridges of the local socket configured to communicate with corresponding remote S2S bridges of a remote socket; sending, by the first local S2S bridge, a first address coherency request in an inter-socket protocol to a first remote S2S bridge upon receiving the first remote write transaction, the first address coherency request being a request to clean all coherent copies of the first address out of one or more caches and written to memory; receiving, by the first local S2S bridge, a first completion response in the inter-socket protocol from the first remote S2S bridge subsequent to sending the first address coherency request, the first completion response being a response indicating that a coherency for the first address is completed; sending, by the first local S2S bridge, a first combination response in the intra-socket protocol to the local RNI upon receiving the first completion response, the first combination response indicating that the coherency for the first address is completed and a buffer is ready to receive a first data for the first address; sending, by the local RNI, the first data for the first address in the intra-socket protocol to the first local S2S bridge upon receiving the first combination response; and forwarding, by the first local S2S bridge, the first data as a write transaction in the inter-socket protocol to the first remote S2S bridge upon receiving the first data.

Clause 14: The method of clause 13, wherein the intra-socket protocol is a Coherent Hub Interconnect (CHI) protocol, wherein the inter-socket protocol is a Cache Coherent Interconnect for Accelerators (CCIX) protocol, or both.

Clause 15: A method of clause 14, wherein the first remote write transaction is a CHI WriteUnique or a CHI WriteNoSnp for the first address, wherein the first address coherency request is a CCIX CleanUnique transaction for the first address, wherein the first completion response is a CCIX Comp transaction for the first address, wherein the first combination response is a CHI CompDBID transaction for the first address, wherein the first data is sent in a CHI NCBWData transaction for the first address, wherein the first data is forwarded in a CCIX WriteBack+Data transaction for the first address, or any combination thereof.

Clause 16: The method of any of clauses 13-15, wherein the one or more local RNIs and the plurality of local S2S bridges are comprised on a single die or a system-on-chip (SoC).

Clause 17: The method of clause 16, wherein the single die or SoC also comprises the one or more IO agents.

Clause 18: The method of any of clauses 16-17, wherein the local socket and the remote socket are separate dies or SoCs.

Clause 19: The method of any of clauses 13-18, wherein none of the one or more local RNIs comprises any hardware-coherent cache.

Clause 20: The method of clause 19, wherein the local socket further comprises one or more local fully coherent request nodes (RNF) configured to communicate with one or more core agents, and wherein the one or more local RNFs do comprise one or more hardware coherent caches.

Clause 21: The method of any of clauses 13-20, further comprising: sending, by the local RNI on behalf of the IO agent, a second remote write transaction for a second address in the intra-socket protocol to a second local S2S bridge, the second local S2S bridge also being one of the plurality of local S2S bridges of the local socket; sending, by the second local S2S bridge, a second address coherency request in an inter-socket protocol to a second remote S2S bridge upon receiving the second remote write transaction, the second address coherency request being a request to clean all coherent copies of the second address out of one or more caches and written to memory; receiving, by the second local S2S bridge, a second completion response in the inter-socket protocol from the second remote S2S bridge subsequent to sending the second address coherency request, the second completion response being a response indicating that a coherency for the second address is completed; sending, by the second local S2S bridge, a second combination response in the intra-socket protocol to the local RNI upon receiving the second completion response, the second combination response indicating that the coherency for the second address is completed and a buffer is ready to receive a second data for the second address; sending, by the local RNI, the second data for the second address in the intra-socket protocol to the second local S2S bridge upon receiving the second combination response; and forwarding, by the second local S2S bridge, the second data in the inter-socket protocol to the second remote S2S bridge upon receiving the second data.

Clause 22: The method of clause 21, wherein the second remote write transaction is sent after sending the first remote write transaction, wherein if the second combination response is received before the first combination response, the method further comprises: waiting until the first combination response is received; sending the first data for the first address to the first local S2S bridge after receiving the first combination response, and sending the second data for the second address to the second local S2S bridge after sending the first data to the first local S2S bridge.

Clause 23: The method of any of clauses 21-22, wherein the intra-socket protocol is a Coherent Hub Interconnect (CHI) protocol, the inter-socket protocol is a Cache Coherent Interconnect for Accelerators (CCIX) protocol, or both, and wherein any combination of the following are true: the second remote write transaction is a CHI WriteUnique or a CHI WriteNoSnp for the second address, the second address coherency request is a CCIX CleanUnique transaction for the second address, the second completion response is a CCIX Comp transaction for the second address, the second combination response is a CHI CompDBID transaction for the second address, the second data is sent in a CHI NCBWData transaction for the second address, and the second data is forwarded in a CCIX WriteBack+Data transaction for the second address.

Clause 24: A local socket comprising at least one means for performing a method of any of clauses 13-23.

Clause 25: A local socket comprising a memory and a processor communicatively connected to the memory, the processor being configured perform a method of any of clauses 13-23.

Clause 26: A non-transitory computer-readable medium storing code for a local socket comprising a memory and a processor communicatively connected to the memory, and instructions stored in the memory and executable by the processor to cause the local socket to perform a method of any of clauses 13-23.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms include, but are not limited to, a music player, a video player, an entertainment unit, a navigation device, a communications device, a smartphone, a personal digital assistant, a fixed location terminal, a tablet computer, a computer, a wearable device, a laptop computer, a server, an automotive device in an automotive vehicle, and/or other types of portable electronic devices typically carried by a person and/or having communication capabilities (e.g., wireless, cellular, infrared, short-range radio, etc.). These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that are able to communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

The word "exemplary" is used herein to mean "serving as an example, instance, or illustration." Any details described herein as "exemplary" is not to be construed as advantageous over other examples. Likewise, the term "examples" does not mean that all examples include the discussed feature, advantage or mode of operation. Furthermore, a particular feature and/or structure can be combined with one or more other features and/or structures. Moreover, at least a portion of the apparatus described herein can be configured to perform at least a portion of a method described herein.

It should be noted that the terms "connected," "coupled," or any variant thereof, mean any connection or coupling, either direct or indirect, between elements, and can encompass a presence of an intermediate element between two elements that are "connected" or "coupled" together via the intermediate element unless the connection is expressly disclosed as being directly connected.

Any reference herein to an element using a designation such as "first," "second," and so forth does not limit the quantity and/or order of those elements. Rather, these designations are used as a convenient method of distinguishing between two or more elements and/or instances of an element. Also, unless stated otherwise, a set of elements can comprise one or more elements.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Nothing stated or illustrated depicted in this application is intended to dedicate any component, action, feature, benefit, advantage, or equivalent to the public, regardless of whether the component, action, feature, benefit, advantage, or the equivalent is recited in the claims.

In the detailed description above it can be seen that different features are grouped together in examples. This manner of disclosure should not be understood as an intention that the claimed examples have more features than are explicitly mentioned in the respective claim. Rather, the disclosure may include fewer than all features of an individual example disclosed. Therefore, the following claims should hereby be deemed to be incorporated in the description, wherein each claim by itself can stand as a separate example. Although each claim by itself can stand as a separate example, it should be noted that-although a dependent claim can refer in the claims to a specific combination with one or more claims-other examples can also encompass or include a combination of said dependent claim with the subject matter of any other dependent claim or a combination of any feature with other dependent and independent claims. Such combinations are proposed herein, unless it is explicitly expressed that a specific combination is not intended. Furthermore, it is also intended that features of a claim can be included in any other independent claim, even if said claim is not directly dependent on the independent claim.

It should furthermore be noted that methods, systems, and apparatus disclosed in the description or in the claims can be implemented by a device comprising means for performing the respective actions and/or functionalities of the methods disclosed.

Furthermore, in some examples, an individual action can be subdivided into one or more sub-actions or contain one or more sub-actions. Such sub-actions can be contained in the disclosure of the individual action and be part of the disclosure of the individual action.

While the foregoing disclosure shows illustrative examples of the disclosure, it should be noted that various changes and modifications could be made herein without departing from the scope of the disclosure as defined by the appended claims. The functions and/or actions of the method claims in accordance with the examples of the disclosure described herein need not be performed in any particular order. Additionally, well-known elements will not be described in detail or may be omitted so as to not obscure the relevant details of the aspects and examples disclosed herein. Furthermore, although elements of the disclosure may be described or claimed in the singular, the plural is contemplated unless limitation to the singular is explicitly stated.

What is claimed is:

1. A local socket comprising:
   one or more local input-output (IO) coherence request nodes (RNI) configured to communicate with corresponding one or more IO agents, the one or more local RNIs comprising a local RNI configured to communicate with an IO agent; and
   a plurality of local socket-to-socket (S2S) bridges configured to communicate with corresponding remote S2S bridges of a remote socket, the plurality of local S2S bridges comprising a first local S2S bridge configured to communicate with a first remote S2S bridge,
   wherein the local RNI is configured to send, on behalf of the IO agent, a first remote write transaction for a first address in an intra-socket protocol to the first local S2S bridge,
   wherein the first local S2S bridge is configured to:
      send a first address coherency request in an inter-socket protocol to a first remote S2S bridge of the remote socket upon receiving the first remote write transaction, the first address coherency request being a request to clean all coherent copies of the first address out of one or more caches and written to memory;
      receive a first completion response in the inter-socket protocol from the first remote S2S bridge subsequent to sending the first address coherency request, the first completion response being a response indicating that a coherency for the first address is completed; and send a first combination response in the intra-socket protocol to the local RNI upon receiving the first completion response, the first combination response indicating that the coherency for the first address is completed and a buffer is ready to receive a first data for the first address, wherein the local RNI is further configured to send the first data for the first address in the intra-socket protocol to the first local S2S bridge upon receiving the first combination response, and wherein the first local S2S bridge is further configured to forward the first data as a write transaction in the inter-socket protocol to the first remote S2S bridge upon receiving the first data.

2. The local socket of claim 1,
wherein the intra-socket protocol is a Coherent Hub Interconnect (CHI) protocol,
wherein the inter-socket protocol is a Cache Coherent Interconnect for Accelerators (CCIX) protocol, or both.

3. The local socket of claim 1, wherein the one or more local RNIs and the plurality of local S2S bridges are comprised on a single die or a system-on-chip (SoC).

4. The local socket of claim 1, wherein none of the one or more local RNIs comprises any hardware-coherent cache.

5. The local socket of claim 1,
wherein the plurality of local S2S bridges further comprises a second local S2S bridge configured to communicate with a second remote S2S bridge,
wherein the local RNI is configured to send, on behalf of the IO agent, a second remote write transaction for a second address in the intra-socket protocol to the second local S2S bridge,
wherein the second local S2S bridge is configured to:
send a second address coherency request in the inter-socket protocol to the second remote S2S bridge upon receiving the second remote write transaction, the second address coherency request being a request to clean all coherent copies of the second address out of one or more caches and written to memory;
receive a second completion response in the inter-socket protocol from the second remote S2S bridge subsequent to sending the second address coherency request, the second completion response being a response indicating that a coherency for the second address is completed; and
send a second combination response in the intra-socket protocol to the local RNI upon receiving the second completion response, the second combination response indicating that the coherency for the second address is completed and a buffer is ready to receive a second data for the second address,
wherein the local RNI is further configured to send the second data for the second address in the intra-socket protocol to the second local S2S bridge upon receiving the second combination response, and
wherein the second local S2S bridge is further configured to forward the second data in the inter-socket protocol to the second remote S2S bridge upon receiving the second data.

6. The local socket of claim 1, wherein the local socket is incorporated into an apparatus selected from the group consisting of a music player, a video player, an entertainment unit, a navigation device, a communications device, a mobile device, a mobile phone, a smartphone, a personal digital assistant, a fixed location terminal, a tablet computer, a computer, a wearable device, an Internet of things (IoT) device, a laptop computer, a server, and a device in an automotive vehicle.

7. The local socket of claim 2,
wherein the first remote write transaction is a CHI Write-Unique or a CHI WriteNoSnp for the first address,
wherein the first address coherency request is a CCIX CleanUnique transaction for the first address,
wherein the first completion response is a CCIX Comp transaction for the first address,
wherein the first combination response is a CHI CompDBID transaction for the first address,
wherein the first data is sent in a CHI NCBWData transaction for the first address,
wherein the first data is forwarded in a CCIX WriteBack+ Data transaction for the first address, or
any combination thereof.

8. The local socket of claim 3, wherein the single die or SoC also comprises the one or more IO agents.

9. The local socket of claim 3, wherein the local socket and the remote socket are separate dies or SoCs.

10. The local socket of claim 4, further comprising:
one or more local fully coherent request nodes (RNF) configured to communicate with one or more core agents,
wherein the one or more local RNFs do comprise one or more hardware coherent caches.

11. The local socket of claim 5,
wherein the local RNI sends the second remote write transaction after sending the first remote write transaction, and
wherein if the local RNI receives the second combination response before the first combination response, the local RNI is configured to wait until the first combination response is received, send the first data for the first address to the first local S2S bridge after receiving the first combination response, and send the second data for the second address to the second local S2S bridge after sending the first data to the first local S2S bridge.

12. The local socket of claim 5,
wherein the intra-socket protocol is a Coherent Hub Interconnect (CHI) protocol, the inter-socket protocol is a Cache Coherent Interconnect for Accelerators (CCIX) protocol, or both, and
wherein any combination of the following are true:
the second remote write transaction is a CHI Write-Unique or a CHI WriteNoSnp for the second address,
the second address coherency request is a CCIX CleanUnique transaction for the second address,
the second completion response is a CCIX Comp transaction for the second address,
the second combination response is a CHI CompDBID transaction for the second address,
the second data is sent in a CHI NCBWData transaction for the second address, and
the second data is forwarded in a CCIX WriteBack+ Data transaction for the second address.

13. A method of a local socket, the method comprising:
sending, by a local input-output (IO) coherence request node (RNI) on behalf of an IO agent, a first remote write transaction for a first address in an intra-socket protocol to a first local S2S bridge, the local RNI being one of one or more local RNIs of the local socket configured to communicate with corresponding one or more IO agents, and the first local S2S bridge being one of a plurality of local S2S bridges of the local socket configured to communicate with corresponding remote S2S bridges of a remote socket;
sending, by the first local S2S bridge, a first address coherency request in an inter-socket protocol to a first remote S2S bridge upon receiving the first remote write transaction, the first address coherency request being a request to clean all coherent copies of the first address out of one or more caches and written to memory;
receiving, by the first local S2S bridge, a first completion response in the inter-socket protocol from the first remote S2S bridge subsequent to sending the first address coherency request, the first completion response being a response indicating that a coherency for the first address is completed;
sending, by the first local S2S bridge, a first combination response in the intra-socket protocol to the local RNI upon receiving the first completion response, the first combination response indicating that the coherency for the first address is completed and a buffer is ready to receive a first data for the first address;
sending, by the local RNI, the first data for the first address in the intra-socket protocol to the first local S2S bridge upon receiving the first combination response; and
forwarding, by the first local S2S bridge, the first data as a write transaction in the inter-socket protocol to the first remote S2S bridge upon receiving the first data.

14. The method of claim 13,
wherein the intra-socket protocol is a Coherent Hub Interconnect (CHI) protocol,
wherein the inter-socket protocol is a Cache Coherent Interconnect for Accelerators (CCIX) protocol, or both.

15. The method of claim 13, wherein the one or more local RNIs and the plurality of local S2S bridges are comprised on a single die or a system-on-chip (SoC).

16. The method of claim 13, wherein none of the one or more local RNIs comprises any hardware-coherent cache.

17. The method of claim 13, further comprising:
sending, by the local RNI on behalf of the IO agent, a second remote write transaction for a second address in the intra-socket protocol to a second local S2S bridge, the second local S2S bridge also being one of the plurality of local S2S bridges of the local socket;
sending, by the second local S2S bridge, a second address coherency request in an inter-socket protocol to a second remote S2S bridge upon receiving the second remote write transaction, the second address coherency request being a request to clean all coherent copies of the second address out of one or more caches and written to memory;
receiving, by the second local S2S bridge, a second completion response in the inter-socket protocol from the second remote S2S bridge subsequent to sending the second address coherency request, the second completion response being a response indicating that a coherency for the second address is completed;
sending, by the second local S2S bridge, a second combination response in the intra-socket protocol to the local RNI upon receiving the second completion response, the second combination response indicating that the coherency for the second address is completed and a buffer is ready to receive a second data for the second address;
sending, by the local RNI, the second data for the second address in the intra-socket protocol to the second local S2S bridge upon receiving the second combination response; and
forwarding, by the second local S2S bridge, the second data in the inter-socket protocol to the second remote S2S bridge upon receiving the second data.

18. The method of claim 14,
wherein the first remote write transaction is a CHI Write-Unique or a CHI WriteNoSnp for the first address,
wherein the first address coherency request is a CCIX CleanUnique transaction for the first address,
wherein the first completion response is a CCIX Comp transaction for the first address,
wherein the first combination response is a CHI CompD-BID transaction for the first address,
wherein the first data is sent in a CHI NCBWData transaction for the first address,
wherein the first data is forwarded in a CCIX WriteBack+Data transaction for the first address, or
any combination thereof.

19. The method of claim 15, wherein the single die or SoC also comprises the one or more IO agents.

20. The method of claim 15, wherein the local socket and the remote socket are separate dies or SoCs.

21. The method of claim 16,
wherein the local socket further comprises one or more local fully coherent request nodes (RNF) configured to communicate with one or more core agents, and
wherein the one or more local RNFs do comprise one or more hardware coherent caches.

22. The method of claim 17,
wherein the second remote write transaction is sent after sending the first remote write transaction,
wherein if the second combination response is received before the first combination response, the method further comprises:
waiting until the first combination response is received;
sending the first data for the first address to the first local S2S bridge after receiving the first combination response; and
sending the second data for the second address to the second local S2S bridge after sending the first data to the first local S2S bridge.

23. The method of claim 17,
wherein the intra-socket protocol is a Coherent Hub Interconnect (CHI) protocol, the inter-socket protocol is a Cache Coherent Interconnect for Accelerators (CCIX) protocol, or both, and
wherein any combination of the following are true:
the second remote write transaction is a CHI Write-Unique or a CHI WriteNoSnp for the second address,
the second address coherency request is a CCIX CleanUnique transaction for the second address,
the second completion response is a CCIX Comp transaction for the second address,
the second combination response is a CHI CompDBID transaction for the second address,
the second data is sent in a CHI NCBWData transaction for the second address, and
the second data is forwarded in a CCIX WriteBack+Data transaction for the second address.

24. A local socket, comprising:
one or more local input-output (IO) coherence request nodes (RNI) configured to communicate with corresponding one or more IO agents, the one or more local RNIs comprising a local RNI configured to communicate with an IO agent; and a plurality of local socket-to-socket (S2S) bridges configured to communicate with corresponding remote S2S bridges of a remote socket, the plurality of local S2S bridges comprising a first local S2S bridge configured to communicate with a first remote S2S bridge, wherein the local RNI comprises means for sending, on behalf of the IO agent, a first remote write transaction for a first address in an intra-socket protocol to the first local S2S bridge, wherein the first local S2S bridge comprises:

means for sending a first address coherency request in an inter-socket protocol to the first remote S2S bridge upon receiving the first remote write transaction, the first address coherency request being a request to clean all coherent copies of the first address out of one or more caches and written to memory;

means for receiving a first completion response in the inter-socket protocol from the first remote S2S bridge subsequent to sending the first address coherency request, the first completion response being a response indicating that a coherency for the first address is completed; and means for sending a first combination response in the intra-socket protocol to the local RNI upon receiving the first completion response, the first combination response indicating that the coherency for the first address is completed and a buffer is ready to receive a first data for the first address, wherein the local RNI further comprises means for sending the first data for the first address in the intra-socket protocol to the first local S2S bridge upon receiving the first combination response, and wherein the first local S2S bridge further comprises means for forwarding the first data as a write transaction in the inter-socket protocol to the first remote S2S bridge upon receiving the first data.

* * * * *